United States Patent
Umehara et al.

(10) Patent No.: US 10,005,043 B2
(45) Date of Patent: *Jun. 26, 2018

(54) GAS SEPARATION MEMBRANES WITH INTERMIXED LAYERS

(71) Applicant: Fujifilm Manufacturing Europe B.V., Tilburg (NL)

(72) Inventors: Takeshi Umehara, Tilburg (NL); Masatoshi Nakanishi, Tilburg (NL); Yujiro Itami, Tilburg (NL); Hiroyuki Noda, Kanagawa (JP); Akihiro Kurima, Kanagawa (JP); Kimiko Iwahashi, Kanagawa (JP)

(73) Assignee: Fujifilm Manufacturing Europe B.V. (NL)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/642,663

(22) Filed: Jul. 6, 2017

(65) Prior Publication Data

US 2017/0296981 A1    Oct. 19, 2017

Related U.S. Application Data

(63) Continuation of application No. 14/409,559, filed as application No. PCT/GB2013/051685 on Jun. 26, 2013, now Pat. No. 9,731,248.

(30) Foreign Application Priority Data

Jun. 26, 2012 (GB) .................................. 1211309.8

(51) Int. Cl.
 *B01D 53/22* (2006.01)
 *B01D 69/12* (2006.01)
 (Continued)

(52) U.S. Cl.
 CPC ........... *B01D 69/12* (2013.01); *B01D 53/228* (2013.01); *B01D 63/08* (2013.01);
 (Continued)

(58) Field of Classification Search
 CPC ................ B01D 67/0006; B01D 71/64; B01D 2323/34; B01D 71/70; B01D 71/32;
 (Continued)

(56) References Cited

U.S. PATENT DOCUMENTS 3,899,309 A    8/1975  Hoehn et al.
4,602,922 A    7/1986  Cabasso et al.
 (Continued)

FOREIGN PATENT DOCUMENTS

JP    S59 66308 A    4/1984
JP    5 64 30620 A   2/1989
 (Continued)

OTHER PUBLICATIONS

International Preliminary Report on Patentability dated Dec. 31, 2014, issued from corresponding PCT/GB2013/051685.
 (Continued)

*Primary Examiner* — Anthony Shumate
(74) *Attorney, Agent, or Firm* — Banner & Witcoff, Ltd.

(57) ABSTRACT

A composite membrane comprising:
a) a porous support;
b) a gutter layer; and
c) a discriminating layer;
wherein at least 10% of the discriminating layer is intermixed with the gutter layer.

16 Claims, 1 Drawing Sheet

Figure 1:
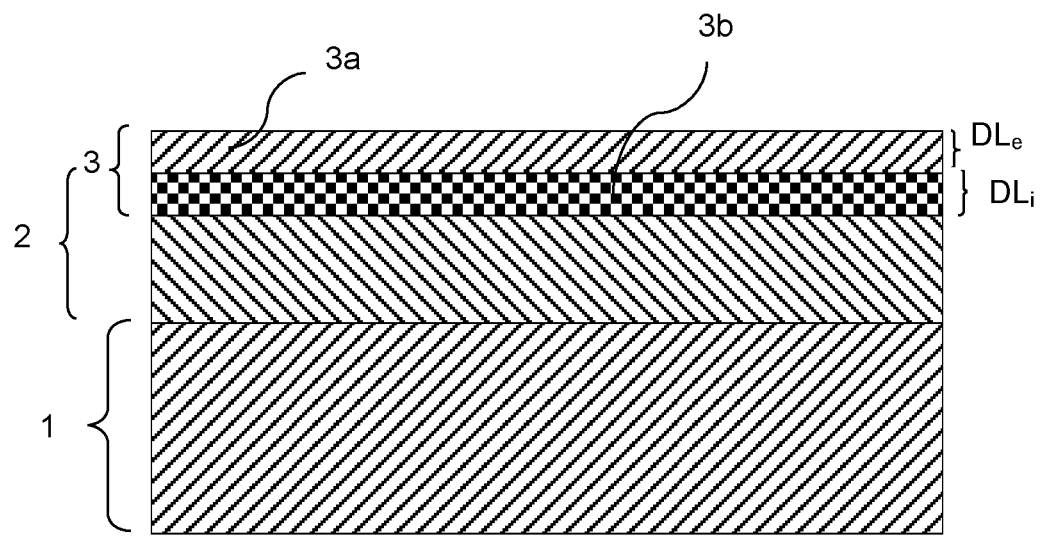

(51) Int. Cl.

| | | |
|---|---|---|
| *B01D 63/08* | (2006.01) | |
| *B01D 71/64* | (2006.01) | |
| *B01D 71/70* | (2006.01) | |
| *B01D 67/00* | (2006.01) | |
| *B01D 71/16* | (2006.01) | |
| *B01D 71/32* | (2006.01) | |
| *B01D 71/82* | (2006.01) | |
| *B01D 69/08* | (2006.01) | |
| *B05D 3/06* | (2006.01) | |
| *B01D 71/62* | (2006.01) | |

(52) U.S. Cl.
CPC ....... *B01D 67/0006* (2013.01); *B01D 67/006* (2013.01); *B01D 67/0081* (2013.01); *B01D 67/0095* (2013.01); *B01D 69/08* (2013.01); *B01D 69/125* (2013.01); *B01D 71/16* (2013.01); *B01D 71/32* (2013.01); *B01D 71/62* (2013.01); *B01D 71/64* (2013.01); *B01D 71/70* (2013.01); *B01D 71/82* (2013.01); *B05D 3/06* (2013.01); *B01D 2053/221* (2013.01); *B01D 2053/224* (2013.01); *B01D 2323/30* (2013.01); *B01D 2323/34* (2013.01); *B01D 2323/345* (2013.01); *B01D 2323/40* (2013.01); *B01D 2325/023* (2013.01); *B01D 2325/04* (2013.01); *B01D 2325/20* (2013.01); *Y02C 10/10* (2013.01)

(58) Field of Classification Search
CPC ........ B01D 69/08; B01D 71/62; B01D 71/82; B01D 63/08; B01D 2323/345; B01D 2323/30; B01D 69/12; B01D 2325/20; B01D 2325/023; B01D 71/16; B01D 69/125; B01D 53/228; B01D 67/0081; B01D 2323/40; B01D 67/0095; B01D 2053/224; B01D 2053/221; B01D 2325/04; B01D 67/006; B05D 3/06; Y02C 10/10
See application file for complete search history.

(56) References Cited

U.S. PATENT DOCUMENTS

| | | | |
|---|---|---|---|
| 4,666,668 A | 5/1987 | Lidorenko et al. | |
| 4,701,187 A * | 10/1987 | Choe | B01D 53/226 95/53 |
| 4,717,394 A | 1/1988 | Hayes | |
| 5,085,676 A | 2/1992 | Ekiner et al. | |
| 5,286,280 A | 2/1994 | Chiou | |
| 5,498,278 A | 3/1996 | Edlund | |
| 5,620,790 A | 4/1997 | Holzki et al. | |
| 5,647,894 A | 7/1997 | Ohara et al. | |
| 5,834,528 A | 11/1998 | Tanaka et al. | |
| 5,871,680 A * | 2/1999 | Macheras | B01D 67/0016 210/500.3 |
| 6,018,060 A * | 1/2000 | Baker | B01D 53/22 549/513 |
| 6,500,233 B1 | 12/2002 | Miller et al. | |
| 6,660,744 B1 * | 12/2003 | Hirst | C07D 487/04 514/210.21 |
| 6,688,477 B2 | 2/2004 | Kalthod | |
| 7,771,520 B1 | 8/2010 | Bossard | |
| 2002/0056371 A1 | 5/2002 | Hayes | |
| 2002/0127387 A1 | 9/2002 | Sale et al. | |
| 2002/0156081 A1 * | 10/2002 | Hirst | C07D 487/04 514/247 |
| 2004/0154978 A1 | 8/2004 | Sale et al. | |
| 2004/0247858 A1 | 12/2004 | Wu et al. | |
| 2006/0220271 A1 | 10/2006 | Jackson et al. | |
| 2006/0234158 A1 | 10/2006 | Hatakeyama | |
| 2007/0134916 A1 | 6/2007 | Iwabuchi et al. | |
| 2007/0249670 A1 * | 10/2007 | Evans | C07C 237/42 514/313 |
| 2010/0050812 A1 * | 3/2010 | Van Heeringen | B01D 53/229 75/392 |
| 2010/0319535 A1 | 12/2010 | Joshi et al. | |
| 2011/0030559 A1 | 2/2011 | Itami | |
| 2011/0036237 A1 | 2/2011 | Okada et al. | |
| 2011/0268959 A1 | 11/2011 | Thottupurathu | |
| 2012/0031833 A1 | 2/2012 | Ho et al. | |
| 2012/0067209 A1 | 3/2012 | Sandru et al. | |
| 2012/0248027 A1 | 10/2012 | Sasaki et al. | |
| 2012/0251868 A1 | 10/2012 | Shinohara et al. | |
| 2012/0297976 A1 | 11/2012 | Sane | |
| 2013/0108531 A1 * | 5/2013 | Mitariten | B01D 53/047 423/219 |
| 2013/0209780 A1 | 8/2013 | Poxson et al. | |
| 2014/0158610 A1 | 6/2014 | Qtaishat et al. | |
| 2014/0208949 A1 | 7/2014 | Ishizuka et al. | |
| 2014/0260986 A1 | 9/2014 | Ishizuka et al. | |
| 2016/0256834 A1 | 9/2016 | Dalwani et al. | |

FOREIGN PATENT DOCUMENTS

| | | |
|---|---|---|
| WO | 2007018425 A1 | 2/2007 |
| WO | 2013046975 A1 | 4/2013 |
| WO | 2013077418 A1 | 5/2013 |
| WO | 2014/001798 A1 | 1/2014 |

OTHER PUBLICATIONS

Perry et al. "Perry's Chemical Engineer's Handbook" The McGraw-Hill Compnaies, Inc. 7th ed. 1997 p. 22-38.

* cited by examiner

GAS SEPARATION MEMBRANES WITH INTERMIXED LAYERS

RELATED APPLICATION DATA

This application is a continuation application which claims priority to U.S. patent application Ser. No. 14/409,559, filed on Dec. 19, 2014, which is a National Stage Application under 35 U.S.C. 371 of co-pending PCT application PCT/GB2013/051685 designating the United States and filed Jun. 26, 2013; which claims the benefit of GB application 1211309.8 and filed Jun. 26, 2012 each of which are hereby incorporated by reference in their entireties.

This invention relates to composite membranes and to their preparation and use for the separation of gases.

Composite gas separation membranes are known from U.S. Pat. No. 5,286,280 ('280). The '280 membranes comprise, in order, a support, a gas-permeable polymeric layer (often referred to as a "gutter layer"), a discriminating layer and optionally an outer protective layer. '280 mentions that the solvents used to form the discriminating layer must not attack the gutter layer, hence the discriminating layer of '280 will not permeate into the gutter layer.

There is a need for robust membranes in which the layers have a low tendency to separate, which can operate at high pressures with good gas flux and good discrimination between gases such as $CO_2$ and $CH_4$.

According to a first aspect of the present invention there is provided a composite membrane comprising:
a) a porous support;
b) a gutter layer; and
c) a discriminating layer;
wherein at least 10% of the discriminating layer is intermixed with the gutter layer.

Figure 2:
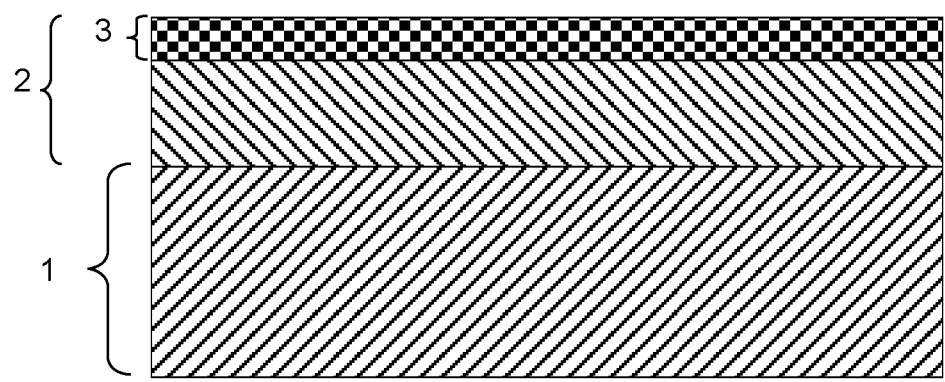

FIGS. 1 and 2 schematically illustrate composite membranes according to the invention.

The composite membrane illustrated schematically in FIGS. 1 and 2 comprises a porous support 1, a gutter layer 2 and a thin discriminating layer 3.

In FIG. 1, the portion of the discriminating layer 3 which is not intermixed with the gutter layer is indicated as 3a and the portion of the discriminating layer which is intermixed with the gutter layer is indicated as 3b. In FIG. 1, $DL_e$ and $DL_i$ respectively indicate the thicknesses of the non-intermixed and intermixed portions of the discriminating layer. As $DL_e$ and $DL_i$ are about equal in FIG. 1, about 50% of the discriminating layer is intermixed with the gutter layer.

In FIG. 2, 100% of the discriminating layer 3 is completely intermixed with the gutter layer 2.

In FIGS. 1 and 2, the relative thicknesses of porous support 1, gutter layer 2 and a discriminating layer 3 are not to scale relative to each other and have been exaggerated to illustrate the invention more clearly. In particular, the discriminating layer 3 is usually very thin compared to the gutter layer 2, but in these drawings we have exaggerated the relative thickness of the discriminating layer relative to the gutter layer to more clearly illustrate the invention.

Also the composite membranes illustrated in FIGS. 1 and 2, optionally further comprises a protective layer on the discriminating layer (not shown).

In the composite membranes of the invention, the gutter and discriminating layer are adhered together very strongly due to the abovementioned intermixing. As a result, the composite membranes are robust and discriminating layer has a very low tendency to peel away from the gutter layer in use, even when the membranes are used at high gas pressures.

The primary purpose of the porous support is to provide mechanical strength to the composite membrane without materially reducing the flux. Therefore the porous support is typically open pored, relative to the discriminating layer.

The porous support may be, for example, a microporous organic or inorganic membrane, or a woven or non-woven fabric.

The porous support may be constructed from any suitable material. Examples of such materials include polysulfones, polyethersulfones, polyimides, polyetherimides, polyamides, polyamideimides, polyacrylonitrile, polycarbonates, polyesters, polyacrylates, cellulose acetate, polyethylene, polypropylene, polyvinylidenefluoride, polytetrafluoroethylene, poly(4-methyl 1-pentene) and especially polyacrylonitrile.

One may use, for example, a commercially available, porous sheet material as the support. Alternatively one may prepare the porous support using techniques generally known in the art for the preparation of microporous materials. In one embodiment one may prepare a porous, non-discriminatory support by curing curable components, then applying further curable components to the formed porous support and curing such components thereby forming the gutter layer and the discriminating layer on the already cured porous support.

The porous support is not limited to sheet form; also porous supports in tubular form can be used.

One may also use a porous support which has been subjected to a corona discharge treatment, glow discharge treatment, flame treatment, ultraviolet light irradiation treatment or the like, e.g. for the purpose of improving its wettability and/or adhesiveness.

The porous support preferably possesses pores which are as large as possible, consistent with providing a smooth surface for the gutter layer and subsequent discriminating layer. The porous support preferably has an average pore size of at least about 50% greater than the average pore size of the discriminating layer, more preferably at least about 100% greater, especially at least about 200% greater, particularly at least about 1000% greater than the average pore size of the discriminating layer.

The pores passing through the porous support typically have an average diameter of 0.001 to 10 μm, preferably 0.01 to 1 μm. The pores at the surface of the porous support will typically have a diameter of 0.001 to 0.1 μm, preferably 0.005 to 0.05 μm.

The pore diameter may be determined by, for example, viewing the surface of the porous support by scanning electron microscopy ("SEM") or by cutting through the support and measuring the diameter of the pores within the porous support, again by SEM.

The porosity at the surface of the porous support may also be expressed as a % porosity, i.e.

$$\% \text{ porosity} = 100\% \times \frac{\text{(area of the surface which is missing due to pores)}}{\text{(total surface area)}}$$

The areas required for the above calculation may be determined by inspecting the surface of the porous support using a SEM.

Thus, in a preferred embodiment, the porous support has a % porosity >1%, more preferably >3%, especially >10%, more especially >20%.

The porosity of the porous support may also be expressed as a $CO_2$ gas permeance (units are $m^3$ (STP)/$m^2 \cdot s \cdot kPa$). When the composite membrane is intended for use in gas separation the porous support preferably has a $CO_2$ gas permeance of 5 to $150 \times 10^{-5}$ $m^3$ (STP)/$m^2 \cdot s \cdot kPa$, more preferably of 5 to 100, most preferably of 7 to $70 \times 10^{-5}$ $m^3$ (STP)/$m^2 \cdot s \cdot kPa$.

Alternatively the porosity is characterised by measuring the $N_2$ gas flow rate through the porous support. Gas flow rate can be determined by any suitable technique, for example using a Porolux™ 1000 device, available from porometer.com.

Typically the Porolux™ 1000 is set at the maximum pressure (about 34 bar) and one measures the flow rate (L/min) of $N_2$ gas through the porous support under test. The $N_2$ flow rate through the porous support at a pressure of about 34 bar for an effective sample area of 2.69 $cm^2$ (effective diameter of 18.5 mm) is preferably >1 L/min, more preferably >5 L/min, especially >10 L/min, more especially >25 L/min.

The higher of these flow rates are preferred because this reduces the likelihood of the gas flux of the resultant composite membrane being reduced by the porous support.

The abovementioned % porosity and permeance refer to the porous support used to make the composite membrane (i.e. before the gutter layer and any other layers have been applied thereto).

The porous support preferably has an average thickness of 20 to 500 μm, preferably 50 to 400 μm, especially 100 to 300 μm.

One may use an ultrafiltration membrane as the porous support, e.g. a polysulfone ultrafiltration membrane, cellulosic ultrafiltration membrane, polytetrafluoroethylene ultrafiltration membrane, polyvinylidenefluoride ultrafiltration membrane and especially polyacrylonitrile ultrafiltration membrane.

Asymmetric ultrafiltration membranes may also be used, including those comprising a porous polymer membrane (preferably of thickness 10 to 150 μm, more preferably 20 to 100 μm) and optionally a woven or non-woven fabric support. The porous support is preferably as thin as possible, provided it retains the desired structural strength.

In one embodiment the gutter layer is present on the porous support and does not permeate into the support to any significant extent. However in a preferred embodiment a portion of the gutter layer is present within the support and a portion of the gutter layer is outside of the support and the following conditions are satisfied:
(i) the portion of the gutter layer outside of the support has an average thickness ($GL_e$) of 10 nm to 900 nm; and
(ii) the portion of the gutter layer present within the support has an average thickness ($GL_i$) of 10% to 350% of $GL_e$.

The portion of the gutter layer outside of the support preferably has an average thickness ($GL_e$) of 200 to 900 nm, more preferably 400 to 900.

The portion of the gutter layer present within the support preferably has an average thickness of 10% to 200% of $GL_e$, more preferably 20% to 90% of $GL_e$.

The thicknesses $GL_e$ and $GL_i$ may be determined by cutting through the composite membrane and examining its cross section by SEM. By measuring the thickness of layers at several locations using a SEM one may calculate the average thickness.

In cases where it is difficult to determine where the various layers begin and end by SEM, one may instead use time-of-flight secondary ion mass spectrometry (ToF-SIMS) depth profiling. For example, when the discriminating layer diffuses into the gutter layer in a graduated manner, the point at which the gutter layer finishes may not be clearly defined and it may therefore be difficult to measure $DL_i$. In such cases, the point at which the discriminating layer is deemed to finish is the point at which the concentration of the discriminating layer in the gutter layer drops to 20%. The point at which the concentration of the discriminating layer in the gutter layer drops to 20% may be determined by ToF-SIMS depth profiling, for example using the conditions described in the Examples. In ToF-SIMS depth profiling, an ion gun is operated in the DC mode during the sputtering phase in order to remove material from the composite membrane surface, and the same ion gun or a second ion gun is operated in the pulsed mode for an acquisition phase. Depth profiling by ToF-SIMS allows monitoring of all species of interest simultaneously, and with high mass resolution and clearly shows the extent to which the discriminating layer intermixes with the gutter layer due to the change in chemical composition at that point. Similarly, ToF-SIMS depth profiling clearly shows the junction between the gutter layer and the porous support due to their very different chemical compositions. For gutter layers rich in silicon-containing compounds, the change in silicon content is a very good marker for the beginning and end of the gutter layer, even when the gutter layer has a heterogenous chemical composition due to different permeation rates of its precursor components. Also the beginning and end of the discriminating layer may similarly be determined. In discriminating layers containing fluorine or acetyl-groups, a significant fall in the fluorine content or acetyl-group content (as measured by ToF-SIMS depth profiling) indicates the end of the discriminating layer.

One may control the extent to which the discriminating layer is intermixed with the gutter layer by any of a number of techniques. For example, one may apply the discriminating layer to the gutter layer in the form of a solution comprising a solvent which partially dissolves or swells the gutter layer. In this way, the components which ultimately form the discriminating layer can permeate into the gutter layer to provide a region where the discriminating layer is intermixed with the gutter layer. By varying the amount of inert solvent and good solvent for the gutter layer, one may also vary the extent to which the discriminating layer intermixes with the gutter layer.

Similarly, when the composition used to form the discriminating layer is curable, one may control the extent to which the discriminating layer is intermixed with the gutter layer by controlling the amount of time the composition is in contact with the gutter layer before it is cured, e.g. by irradiation. When the composition is cured shortly after it has been applied to the gutter layer, the extent of intermixing is less than when the composition is cured after a longer time period in contact with the gutter layer.

A particularly good solvent non-solvent pair for controlling the extent to which the discriminating layer is intermixed with the gutter layer is methyl ethyl ketone (MEK) and tetrahydrofuran (THF). For many gutter layers, increasing the proportion of THF increases the % intermixing, while increasing the proportion of MEK decreases the % intermixing. By controlling the ratio of MEK:THF in the composition used to form the discriminating layer one may therefore also control the extent to which the discriminating layer is intermixed with the gutter layer from 10 and 100%.

The % of the discriminating layer which is intermixed with the gutter layer is preferably the volume % (vol %). As illustrated in FIG. 1, the average thicknesses of the portion of the discriminating layer which is not intermixed with the gutter layer may be referred to as $DL_e$. The average thicknesses of the portion of the discriminating layer which is intermixed with the gutter layer may be referred to as $DL_i$. Therefore one may determine the (vol.) % of the discriminating layer which is intermixed with the gutter layer by measuring $DL_i$ and $DL_e$ and performing the calculation $[DL_i/(DL_e+DL_i)]\times100\%$. Thus when the thickness $DL_i$ is 10% of the total thickness of the discriminating layer $(DL_e+DL_i)$, then 10% of the discriminating layer is intermixed with the gutter layer. When $DL_e$ is 0 and $DL_i$ is >0, 100% of the discriminating layer is intermixed with the gutter layer.

One may control the extent to which the gutter layer permeates into the support (i.e. the ratio of $GL_i:GL_e$) by any of a number of techniques. For example, when the gutter layer is obtained by curing a curable composition, one may appropriately select a curable composition viscosity and time delay between applying this composition to the porous support and curing. By varying the viscosity and/or time delay, one may also vary the % of the gutter layer which is present within the porous support (e.g. to ensure it is 10 to 350%).

One may control the overall thickness of the gutter layer $(GL_i+GL_e)$ by controlling the solids content and amount of curable composition applied to the porous support per unit area.

In order to reduce the value of $GL_i$, one may partially fill the pores of the porous support with an inert liquid before applying a radiation-curable composition to the porous support. This inert liquid is not radiation-curable and prevents the radiation-curable liquid which forms the gutter layer from permeating too far into the porous support and thereby ensures the desired proportion of gutter layer is within the porous support. Preferably the inert liquid is immiscible with the radiation-curable composition used to form the gutter layer. This technique has an advantage over the first technique mentioned above in that one may form thinner membranes and more application techniques are available for lower viscosity, radiation-curable compositions.

Another option for ensuring that the curable composition does not permeate excessively into the porous support (i.e. to keep the value of $GL_i$ low) is to increase the hydrodynamic radius (Rhyd) of a radiation-curable polymer used to form the gutter layer. Rhyd may be increased by increasing the extent to which the radiation-curable polymer is crosslinked. Rhyd can be suitably determined by dynamic light scattering.

In one embodiment, the radiation-curable composition used to form the gutter layer comprises a partially crosslinked, radiation-curable polymer ("PCP Polymer"), preferably having a Rhyd of more than half the average diameter of at least 50% of the pores at the surface of the porous support.

The PCP Polymer may be obtained by partially curing a composition comprising one or more curable components (e.g. monomers, oligomers and/or polymers), at least one of which comprises a dialkylsiloxane group. Preferably the partial cure is performed by a thermally initiated polymerisation process.

In a preferred embodiment, at least one of the curable components comprises a group which is both thermally curable and radiation curable. This is because one may then use a thermally initiated process for preparing the PCP Polymer and subsequently use a radiation initiated process for forming the gutter layer on the porous support. Alternatively, the thermally curable group and the radiation curable groups are different groups and are part of the same component used to from the PCP Polymer.

As thermal curing is a relatively slow process, one may partially cure the curable components thermally to form the PCP Polymer, then stop or slow down the thermal cure process, then apply a composition containing the PCP Polymer to the support in the form of a composition comprising an inert solvent, and then irradiate the composition on the support to form the gutter layer. The thermal cure process may be stopped or slowed down simply by cooling (e.g. to below 30° C.) and/or diluting the composition and/or removing the catalyst if present used to make the PCP Polymer at an appropriate time.

Groups which are curable both thermally and by irradiation include epoxy groups and ethylenically unsaturated groups such as (meth)acrylic groups, e.g. (meth)acrylate groups and (meth)acrylamide groups.

Typically the components used to form the PCP Polymer are selected such that they are reactive with each other. For example, a component having an epoxy group is reactive with a component comprising, for example, an amine, alkoxide, thiol or carboxylic acid group. One or more of the components used to form the PCP Polymer may also have more than one curable group. Components having an ethylenically unsaturated group may be reacted with other components by a free radical mechanism or, alternatively, with a nucleophilic component having for example one or more thiol or amine groups.

The PCP Polymer is preferably obtained by thermally curing a composition comprising:
(i) a component which is both thermally curable and radiation curable and which comprises one or more dialkoxysilane groups;
(ii) a crosslinking agent which is copolymerisable with component (i) when heated; and
(iii) inert solvent; and optionally
(iv) a catalyst.

The term "comprising" as used in this specification is to be interpreted as specifying the presence of the stated parts, steps or components, but does not exclude the presence of one or more additional parts, steps or components.

Reference to an element by the indefinite article "a" or "an" in this specification does not exclude the possibility that more than one of the element(s) is present, unless the context clearly requires that there be one and only one of the elements. The indefinite article "a" or "an" thus usually means "at least one".

Preferably the amount of inert solvent present in the composition is from 5 to 95 wt %, more preferably 10 to 80 wt %, especially 30 to 70 wt %.

Component (i) preferably comprises at least 3 radiation-curable groups per molecule.

The alkyl groups in the dialkylsiloxane groups are preferably each independently $C_{1-4}$-alkyl groups, especially methyl groups.

Preferably component (i) is free from phenyl siloxane groups (e.g. of formula —(Si(Ph)$_2$-O)— groups wherein Ph is a phenyl or phenylene group.

Component (i) preferably has a number average molecular weight ("NAMW"), of 1 to 500 kDa, preferably 1 to 100 kDa, especially 2 to 50 kDa. The NAMW may be determined by any technique known in the art such as dynamic light scattering or size exclusion chromatography.

Component (i) is preferably present in an amount of 1 to 95 wt %, more preferably 5 to 75, especially 10 to 50 wt %, relative to the weight of the composition used to make the PCP Polymer.

As examples of component (i) there may be mentioned polydimethylsiloxane epoxy (meth)acrylates, polydimethylsiloxane (meth)acrylates, and allyl modified, vinyl modified, (meth)acrylic modified, epoxy-modified polydimethylsiloxanes and mixtures comprising two or more thereof.

Component (i) may also comprise several different radiation-curable components comprising one or more dialkoxysilane groups components.

Component (i) also comprises one or more thermally curable groups. This is necessary so that component (i) can cure thermally to provide the PCP Polymer.

Examples of crosslinking agents which may be used as component (ii) include: polydimethylsiloxane comprising two or more reactive groups, for example two or more groups selected from carboxylic acid, hydroxyl, thiol and/or anhydride groups, preferably polydimethylsiloxane having at least two of such groups (e.g. at both ends); (cyclo) aliphatic or aromatic di-, tri- or poly-carboxylic acids, e.g. succinic acid, glutaric acid, adipic acid, suberic acid, azelaic acid, sebacic acid, 1,2-benzenedicarboxylic acid, 1,3-benzenedicarboxylic acid, 1,4-benzenedicarboxylic acid, trimesic acid; (cyclo)aliphatic or aromatic di-, tri- or poly-thiols, e.g. 1,2-ethanedithiol, 1,4-butanedithiol, 1,6-hexanedithiol, benzene-1,2-dithiol, benzene-1,3-dithiol, benzene-1,4-dithiol, 1,2-benzenedimethanethiol, 1,3-benzenedimethanethiol, 1,4-benzenedimethanethiol or toluene-3,4-dithiol; (cyclo)aliphatic or aromatic di-, tri- or poly-amines, e.g. ethylenediamine, 1,2-diaminopropane, 1,3-diaminopropane, 1,4-diaminobutane, cadaverine, hexamethylenediamine, 1,8-diaminooctane, 1,2-bis(3-aminopropylamino)ethane, 1,2-diaminocyclohexane, 4-aminobenzylamine, o-xylylenediamine, o-phenylenediamine, m-phenylenediamine, p-phenylenediamine; or (cyclo)aliphatic or aromatic anhydrides, e.g. succinic anhydride, 3,3-dimethylglutaric anhydride, ethylenediaminetetraacetic dianhydride, glutaric anhydride, phenylsuccinic anhydride, pyromellitic dianhydride, or phthalic anhydride; metal alkoxides, e.g. alkoxides of zirconium, titanium or niobium, especially titanium (IV) isopropoxide, titanium (IV) ethoxide, zirconium propoxide and/or niobium ethoxide. Preferably the crosslinking agent comprises two (i.e. two and not more than two) reactive groups.

When component (ii) is or comprises a metal complex it may also serve as the metal complex mentioned in the first aspect of the present invention.

The function of the inert solvent (iii) is to provide the composition used to make the PCP Polymer with a concentration suitable for the thermal crosslinking reaction to proceed efficiently and/or to control the viscosity of the composition. Typically the inert solvent used as component (iii) comprises one or more organic solvents, especially water-immiscible organic solvent(s). The inert solvent is referred to as "inert" because it is not curable.

As examples of inert solvents there may be mentioned: $C_5$-$C_{10}$ (cyclo)alkanes, benzene, alkylbenzenes (e.g. toluene), $C_3$-$C_{10}$ (optionally branched) ketones, $C_4$-$C_{10}$ cyclic ketones, $C_4$-$C_{10}$ (optionally branched) esters, $C_4$-$C_{10}$ cyclic esters, $C_4$-$C_{10}$ (optionally branched) ethers, $C_4$-$C_{10}$ cyclic ethers and especially n-heptane and n-octane. Preferably the inert solvent comprises one or more, especially from 1 to 8, of the abovementioned preferred inert solvents.

Suitable catalysts (iv) include, for example, amine, phosphonium and metal compounds, e.g. amines such as 2-ethylhexylamine, bis(2-ethylhexyl)amine, dodecyldimethylamine, n,n-dimethylbenzylamine, 2-ethylimidazole, 1,8-diazabicyclo[5.4.0]undec-7-ene, tetramethyl guanidine, tetrabutylammonium chloride, benzyltrimethyl ammonium bromide, benzyltrimethyl ammonium hydroxide, tetrabutyl ammonium hydroxide, crosslinked polyvinylpyridine, and polymer bound amines such as polymer bound 1,4-diazabicyclo[2.2.2]octane hydrochloride, polymer bound 1,8-diazabicyclo[5.4.0] undec-7-ene and polymer bound tetraalkylammonium carbonate; phosphonium compounds such as tetrabutyl phosphonium bromide, pentyltriphenylphosphonium bromide, polymer bound triphenylphosphonium chloride; metal compounds such as titanium (iv) isopropoxide, diisopropoxytitanium-bis-(acetylacetonate), titanium (iv) 2-ethylhexyloxide, titanium (iv) butoxide, titanium butylphosphate, zirconium (iv) propoxide, zirconium (iv) ethoxide, zirconium (iv) acetylacetonate, zirconium (iv) bis(diethyl citrato)-dipropoxide, niobium ethoxide, aluminum acetylacetonate, aluminum lactate, bismuth octoate, calcium octoate, cerium naphthenate, chromium (iii) 2-ethylhexanoate, cobalt octoate, copper (ii) acetylacetonate, iron (iii) acetylacetonate, magnesium 2,4-pentadionate, manganese naphthenate, nickel acetylacetonate, stannous octoate, titanium ethyl acetoacetate chelate, titanium acetylacetonate chelate, titanium triethanolamine chelate, zinc acetate, zinc acetylacetonate, zinc di-2-ethylhexyldithio-phosphate, zinc nitrate, zinc octoate, zirconium 6-methylhexanedione, zirconium octoate, zirconium (iv) trifluoroacetylacetone, and the like. Catalysts generally are used in concentrations ranging from about 0.004 to about 1 wt %, preferably from about 0.01 to about 0.5 wt %, relative to the total weight of curable components.

The radiation-curable composition which may be used to form the gutter layer preferably comprises:
(1) 0.5 to 50 wt % of a PCP Polymer;
(2) 0 to 5 wt % of a photo-initiator; and
(3) 50 to 99.5 wt % of inert solvent.

In order for the PCP Polymer to be radiation-curable, it has at least one radiation-curable group. Radiation curable groups include ethylenically unsaturated groups (e.g. (meth) acrylic groups (e.g. $CH_2$=CRC(O)— groups), especially (meth)acrylate groups (e.g. $CH_2$=CR C(O)O— groups), (meth)acrylamide groups (e.g. $CH_2$=CR C(O)NR— groups), wherein each R independently is H or $CH_3$) and especially epoxide groups (e.g. glycidyl and epoxycyclohexyl groups). Preferably the PCP Polymer comprises epoxide groups because such groups do not suffer from cure inhibition due to the presence of oxygen. The PCP polymers have a high affinity for oxygen and this oxygen can sometimes inhibit the curing of other curable groups.

The preferred ethylenically unsaturated groups are acrylate groups because of their fast polymerisation rates, especially when the irradiation uses UV light. Many compounds having acrylate groups are also easily available from commercial sources.

Photo-initiators may be included in the curable composition and are usually required when curing uses UV radiation. Suitable photo-initiators are those known in the art such as radical type, cation type or anion type photo-initiators.

Cationic photo-initiators are preferred when the PCP Polymer comprises curable groups such as epoxy, oxetane, other ring-opening heterocyclic groups or vinyl ether groups.

Preferred cationic photo-initiators include organic salts of non-nucleophilic anions, e.g. hexafluoroarsinate anion, antimony (V) hexafluoride anion, phosphorus hexafluoride anion and tetrafluoroborate anion. Commercially available cationic photo-initiators include UV-9380c, UV-9390c (manufactured by Momentive performance materials), UVI-6974, UVI-6970, UVI-6990 (manufactured by Union Carbide Corp.), CD-1010, CD-1011, CD-1012 (manufactured by Sartomer Corp.), Adekaoptomer™ SP-150, SP-151, SP-170, SP-171 (manufactured by Asahi Denka Kogyo Co., Ltd.), Irgacure™ 250, Irgacure™ 261 (Ciba Specialty Chemicals Corp.), CI-2481, CI-2624, CI-2639, CI-2064 (Nippon Soda Co., Ltd.), DTS-102, DTS-103, NAT-103, NDS-103, TPS-103, MDS-103, MPI-103 and BBI-103 (Midori Chemical Co., Ltd.). The above mentioned cationic photo-initiators can be used either individually or in combination of two or more.

Radical Type I and/or type II photo-initiators may also be used.

Examples of radical type I photo-initiators are as described in WO 2007/018425, page 14, line 23 to page 15, line 26, which are incorporated herein by reference thereto.

Examples of radical type II photo-initiators are as described in WO 2007/018425, page 15, line 27 to page 16, line 27, which are incorporated herein by reference thereto.

Preferably the weight ratio of photo-initiator to radiation-curable components present in the radiation-curable composition is between 0.001 and 0.2 to 1, more preferably between 0.01 and 0.1 to 1. A single type of photo-initiator may be used but also a combination of several different types.

When no photo-initiator is included in the radiation-curable composition, the composition can be advantageously cured by electron-beam exposure. Preferably the electron beam output is between 50 and 300 keV. Curing can also be achieved by plasma or corona exposure.

The function of the inert solvent (3) is to provide the radiation-curable composition with a viscosity suitable for the particular method used to apply the curable composition to the porous support. For high speed application processes one will usually choose an inert solvent of low viscosity. The number of parts of component (3) is preferably 70 to 99.5 wt %, more preferably 80 to 99 wt %, especially 90 to 98 wt %.

In a specific embodiment there is no solvent present.

In some instances, the individual components within the curable composition used to make the gutter layer may permeate into the porous supports at different rates. Therefore it is possible for the chemical composition of the gutter layer to be heterogeneous, e.g. with the portion of the gutter layer which is present within the support having a different chemical composition to the portion of the gutter layer which is outside of the support, due to these differences in permeation rates. It will be understood, therefore, that the present invention includes within its scope composite membranes, as defined above, where the gutter layer is homogenous or heterogenous.

Conveniently the composite membranes of the present invention may be prepared by a process comprising the steps of applying a radiation-curable composition to a porous support, preferably using a multilayer coating method (e.g. a consecutive multilayer coating method), optionally allowing the radiation-curable composition to permeate into the support, irradiating the radiation-curable composition to form a gutter layer, applying to the gutter layer a composition used to form the discriminating layer on the gutter layer and allowing at least 10% of the composition to permeate into the gutter layer.

In a preferred consecutive multilayer process a layer of the radiation-curable composition and the discriminating layer (or the chemicals used to prepare the discriminating layer) are applied consecutively to the porous support, with the radiation-curable composition being applied before the discriminating layer.

In order to produce a sufficiently flowable composition for use in a high speed coating machine, the radiation-curable composition preferably has a viscosity below 4000 mPa·s when measured at 25° C., more preferably from 0.4 to 1000 mPa·s when measured at 25° C. Most preferably the viscosity of the radiation-curable composition is from 0.4 to 500 mPa·s when measured at 25° C. For coating methods such as slide bead coating the preferred viscosity is from 1 to 100 mPa·s when measured at 25° C. The desired viscosity is preferably achieved by controlling the amount of solvent in the radiation-curable composition and/or by the conditions for preparing the radiation curable polymer.

In the multi-layer coating methods mentioned above one may optionally be used to apply a lower inert solvent layer to the porous support followed by applying the radiation-curable composition.

With suitable coating techniques, coating speeds of at least 5 m/min, e.g. at least 10 m/min or even higher, such as 15 m/min, 20 m/min, or even up to 100 m/min, can be reached. In a preferred embodiment the radiation-curable composition is applied to the support at one of the aforementioned coating speeds.

The thickness of the gutter layer on the support may be influenced by controlling the amount of curable composition per unit area applied to the support. For example, as the amount of curable composition per unit area increases, so does the thickness of the resultant gutter layer. The same principle applies to formation of the discriminating layer and the optional protective layer.

While it is possible to practice the invention on a batch basis with a stationary porous support, to gain full advantage of the invention it is much preferred to perform the process on a continuous basis using a moving porous support, e.g. the porous support may be in the form of a roll which is unwound continuously or the porous support may rest on a continuously driven belt. Using such techniques the radiation-curable composition can be applied to the porous support on a continuous basis or it can be applied on a large batch basis. Removal of the inert solvent from the radiation-curable composition membrane can be accomplished at any stage after the radiation-curable composition has been applied to the support, e.g. by evaporation.

Thus in a preferred process, the radiation-curable composition is applied continuously to the porous support by means of a manufacturing unit comprising a radiation-curable composition application station, the composition is cured using an irradiation source located downstream from the radiation-curable composition application station, the discriminating layer is formed on the gutter layer by a discriminating layer application station and the resultant composite membrane is collected at a collecting station, wherein the manufacturing unit comprises a means for moving the porous support from the radiation-curable composition application station to the irradiation source and to the discriminating layer application station and to the composite membrane collecting station.

In one embodiment the discriminating layer is formed on the gutter layer by a radiation curing process. Under such circumstances, the manufacturing unit preferably further comprises an irradiation source or a heater located downstream from the discriminating layer application station, thereby radiation- or thermally-curing the components used to form the discriminating layer.

The radiation-curable composition application station may be located at an upstream position relative to the irradiation source and the irradiation source is located at an upstream position relative to the discriminating layer application station.

The gutter layer usually has the function of providing a smooth and continuous surface for the discriminating layer. While it is preferred for the gutter layer to be pore-free, the presence of some pores usually does not reduce the permselectivity of the final membrane because the discriminating layer is often able to fill minor defects in the gutter layer.

Preferably the gutter layer comprises dialkylsiloxane groups, especially dimethylsiloxane groups.

The gutter layer is preferably essentially nonporous, i.e. any pores present therein have an average diameter <1 nm. This does not exclude the presence of defects which may be significantly larger. Defects may be corrected by the discriminating layer as described above.

The irradiation step may be performed using any source which provides the wavelength and intensity of radiation necessary to cause the radiation-curable composition to polymerise.

For example, electron beam, UV, visible and/or infra red radiation may be used to cure the composition, the appropriate radiation being selected to match the composition. For UV curing a mercury arc lamp is particularly effective, but light emitting diodes can also be used.

Preferably radiation curing of the radiation-curable composition begins within 7 seconds, more preferably within 5 seconds, most preferably within 3 seconds, of the radiation-curable composition being applied to the porous support.

Preferably the curing is achieved by irradiating the radiation-curable composition for less than 30 seconds, more preferably less than 10 seconds, e.g. less than 5 seconds.

The radiation-curable composition is preferably irradiated with ultraviolet light or an electron beam.

Preferably the irradiation uses ultraviolet light. Suitable wavelengths are for instance UV-A (400 to >320 nm), UV-B (320 to >280 nm), UV-C (280 to 200 nm), provided the wavelength matches with the absorbing wavelength of any photo-initiator included in the composition.

Suitable sources of ultraviolet light include mercury arc lamps, carbon arc lamps, low pressure mercury lamps, medium pressure mercury lamps, high pressure mercury lamps, swirlflow plasma arc lamps, metal halide lamps, xenon lamps, tungsten lamps, halogen lamps, lasers and ultraviolet light emitting diodes. Particularly preferred are ultraviolet light emitting lamps of the medium or high pressure mercury vapour type. In addition, additives such as metal halides may be present to modify the emission spectrum of the lamp. In most cases lamps with emission maxima between 200 and 450 nm are particularly suitable.

The energy output of the irradiation source is preferably from 20 to 1000 W/cm, preferably from 40 to 500 W/cm but may be higher or lower as long as the desired exposure dose can be realized.

The discriminating layer preferably has pores of average diameter below 2 nm, preferably below 1 nm, and preferably is substantially non-porous. Preferably the discriminating layer has a very low permeability to liquids.

The discriminating layer preferably has an average thickness of 10 to 400 nm, more preferably 10 to 300 nm, especially 20 to 100 nm.

The average thickness may be determined by cutting through the composite membrane and measuring the thickness of the discriminating layer above and within the gutter layer in several places using a scanning electron microscope and calculating the average. Preferably, however, the thickness measurements are performed by Tof-SIMS depth profiling as described above.

Preferably the gutter layer contains a metal and Si (silicon) in a molar ratio of at least 0.0005, especially in a ratio of about 0.008:1.

The composition used to make the discriminating layer preferably comprises a polymer, an inert solvent and optionally an initiator. The inert solvent may be any solvent capable of dissolving the polymer used to form the discriminating layer. Suitability of the solvent is determined by the properties of the polymer and the concentration desired. Suitable solvents include water, $C_{5-10}$ alkanes, e.g. cyclohexane, heptane and/or octane; alkylbenzenes, e.g. toluene, xylene and/or $C_{10-16}$ alkylbenzenes; $C_{1-6}$ alkanols, e.g. methanol, ethanol, n-propanol, isopropanol, n butanol, sec-butanol, tert-butanol, n-pentanol, cyclopentanol and/or cyclohexanol; linear amides, e.g. dimethylformamide or dimethylacetamide; ketones and ketone-alcohols, e.g. acetone, methyl ether ketone, methyl isobutyl ketone, cyclohexanone and/or diacetone alcohol; ethers, e.g. tetrahydrofuran and/or dioxane; diols, preferably diols having from 2 to 12 carbon atoms, e.g. pentane-1,5-diol, ethylene glycol, propylene glycol, butylene glycol, pentylene glycol, hexylene glycol and/or thiodiglycol; oligo- and poly-alkyleneglycols, e.g. diethylene glycol, triethylene glycol, polyethylene glycol and/or polypropylene glycol; triols, e.g. glycerol and/or 1,2,6 hexanetriol; mono-$C_{1-4}$-alkyl ethers of diols, preferably mono-$C_{1-4}$-alkyl ethers of diols having 2 to 12 carbon atoms, e.g. 2-methoxyethanol, 2-(2-methoxyethoxy)ethanol, 2-(2 ethoxyethoxy)-ethanol, 2-[2-(2-methoxyethoxy)ethoxy]ethanol, 2-[2-(2-ethoxyethoxy)-ethoxy]-ethanol and/or ethyleneglycol monoallylether; cyclic amides, e.g. 2-pyrrolidone, N-methyl-2-pyrrolidone, N-ethyl-2-pyrrolidone, caprolactam and/or 1,3-dimethylimidazolidone; cyclic esters, e.g. caprolactone; sulphoxides, e.g. dimethyl sulphoxide and/or sulpholane; and mixtures comprising two or more of the foregoing, particularly a mixture comprising methyl ethyl ketone and tetrahydrofuran.

The discriminating layer preferably comprises a polyimide, cellulose acetate, polyethyleneoxide or polyetherimide, especially a polyimide comprising trifluoromethyl groups. A particularly preferred discriminating layer comprises a polyimide comprising groups of the Formula (1):

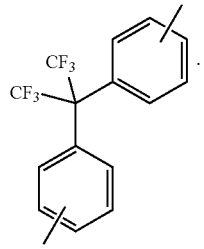

Formula (1)

Polyimides comprising trifluoromethyl groups may be prepared by, for example, the general methods described in U.S. Pat. No. Reissue 30,351 (based on U.S. Pat. No. 3,899,309), U.S. Pat. No. 4,717,394 and U.S. Pat. No. 5,085,676.

When the discriminating layer is cured after applying it to the gutter layer the composition used to prepare the discriminating layer preferably comprises an initiator, preferably a thermal initiator or a photoinitiator. The initiator may be selected from those described above for the gutter layer.

The discriminating layer may be formed on the gutter layer by any suitable technique, for example by a process comprising any of the coating methods described above in relation to preparation of the gutter layer.

For improving the adhesion of the discriminating layer onto the gutter layer, the latter may be treated by a corona discharge or plasma treatment before forming the discriminating layer thereon. For the corona or plasma treatment generally an energy dose of 0.5 to 100 kJ/m$^2$ is preferred.

The optional protective layer may be formed on the discriminating layer by any suitable technique, for example by a process comprising any of the coating methods described above in relation to preparation of the gutter layer.

The protective layer, when present, preferably is highly permeable to the gases or vapours that are to be separated. Preferably the protective layer comprises dialkylsiloxane groups.

The protective layer optionally has surface characteristics which influence the functioning of the composite membrane, for example by making the membrane surface more hydrophilic.

The composite membrane preferably has a pure water permeability at 20° C. of less than $6.10^{-8}$ m$^3$/m$^2$·s·kPa, more preferably less than $3.10^{-8}$ m$^3$/m$^2$·s·kPa.

The overall dry thickness of the composite membrane will typically be 20 to 500 μm, preferably from 30 to 300 μm.

In one embodiment, the gutter layer is applied to the porous support by meniscus type dip coating of a radiation-curable composition onto the porous support and the discriminating layer (or the components from which the discriminating layer is derived) is applied to the gutter layer by reverse kiss gravure coating, meniscus type dip coating or pre-metered slot die coating. Alternatively the radiation-curable composition may be applied to the support by pre-metered slot die coating or multi roll gravure coating. The radiation-curable composition and the discriminating layer may also be applied by curtain coating if desired.

For production of a composite membrane on a small scale, it is convenient to apply all of the layers (i.e. the gutter layer, discriminating layer and protective layer (when present)) by reverse kiss gravure coating, forward kiss gravure coating, meniscus type dip coating, pre-metered slot die coating or spin coating. A three-roll offset gravure coating may also be used, especially when the compositions to be applied to the support etc. have relatively high viscosity.

The process for making the composite membrane may contain further steps if desired, for example washing and/or drying one or more of the various layers and removing the inert solvent from the composite membrane, e.g. by evaporation.

The composite membrane is preferably in tubular or, more preferably, in sheet form. Tubular forms of membrane are sometimes referred to as being of the hollow fibre type. Membranes in sheet form are suitable for use in, for example, spiral-wound, plate-and-frame and envelope cartridges.

The composite membranes are particularly suitable for separating a feed gas containing a target gas into a gas stream rich in the target gas and a gas stream depleted in the target gas.

For example, a feed gas comprising polar and non-polar gases may be separated into a gas stream rich in polar gases and a gas stream depleted in polar gases. In many cases the membranes have a high permeability to polar gases, e.g. $CO_2$, $H_2S$, $NH_3$, $SO_x$, and nitrogen oxides, especially $NO_x$, relative to non-polar gases, e.g. alkanes, $H_2$, and $N_2$.

The target gas may be, for example, a gas which has value to the user of the composite membrane and which the user wishes to collect. Alternatively the target gas may be an undesirable gas, e.g. a pollutant or 'greenhouse gas', which the user wishes to separate from a gas stream in order to protect the environment.

The composite membranes are particularly useful for purifying natural gas (a mixture which comprises methane) by removing polar gases ($CO_2$, $H_2S$); for purifying synthesis gas; and for removing $CO_2$ from hydrogen and from flue gases. Flue gases typically arise from fireplaces, ovens, furnaces, boilers, combustion engines and power plants. The composition of flue gases depend on what is being burned, but usually they contain mostly nitrogen (typically more than two-thirds) derived from air, carbon dioxide ($CO_2$) derived from combustion and water vapour as well as oxygen. Flue gases also contain a small percentage of pollutants such as particulate matter, carbon monoxide, nitrogen oxides and sulphur oxides. Recently the separation and capture of $CO_2$ has attracted attention in relation to environmental issues (global warming).

The composite membranes of the invention are particularly useful for separating the following: a feed gas comprising $CO_2$ and $N_2$ into a gas stream richer in $CO_2$ than the feed gas and a gas stream poorer in $CO_2$ than the feed gas; a feed gas comprising $CO_2$ and $CH_4$ into a gas stream richer in $CO_2$ than the feed gas and a gas stream poorer in $CO_2$ than the feed gas; a feed gas comprising $CO_2$ and $H_2$ into a gas stream richer in $CO_2$ than the feed gas and a gas stream poorer in $CO_2$ than the feed gas, a feed gas comprising $H_2S$ and $CH_4$ into a gas stream richer in $H_2S$ than the feed gas and a gas stream poorer in $H_2S$ than the feed gas; and a feed gas comprising $H_2S$ and $H_2$ into a gas stream richer in $H_2S$ than the feed gas and a gas stream poorer in $H_2S$ than the feed gas.

Preferably the composite membrane has a $CO_2/CH_4$ selectivity ($\alpha$ $CO_2/CH_4$)>20. Preferably the selectivity is determined by a process comprising exposing the membrane to a 13:87 mixture by volume of $CO_2$ and $CH_4$ at a feed pressure of 6000 kPa and a temperature of 40° C.

Preferably the composite membrane has a $CO_2/N_2$ selectivity ($\alpha$ $CO_2/N_2$)>35. Preferably the selectivity is determined by a process comprising exposing the membrane to $CO_2$ and $N_2$ separately at feed pressures of 2000 kPa and a temperature of 40° C.

While this specification emphasises the usefulness of the composite membranes of the present invention for separating gases, especially polar and non-polar gases, it will be understood that the composite membranes can also be used for other purposes, for example providing a reducing gas for the direct reduction of iron ore in the steel production industry, dehydration of organic solvents (e.g. ethanol dehydration), pervaporation and vapour separation and also for breathable apparel. The composite membranes of the present invention are particularly useful for refining methane from biogas, e.g. using a membrane/absorption hybrid method in conjunction with an absorption solution, for example, as described in JP-A-2007-297605.

According to a further aspect of the present invention there is provided a gas separation module comprising a composite membrane according to the first aspect of the present invention.

The module may take any convenient form, for example include spiral, hollow, pleat, tubular, plate and frame modules etc. are preferred.

The composite membranes of the present invention exhibit good flux and separation selectivity. They can endure bending and have a low tendency to form undesirable pin holes. The membranes are stable under a variety of conditions, including hot and humid conditions.

The invention is now illustrated by the following non-limiting examples in which all parts and percentages are by weight unless otherwise specified. ("Ex." means Example. "CEx." means Comparative Example. GL means gutter layer, DL means discriminating layer and PL means protective layer).

The following materials were used in the Examples:

PAN is a polyacrylonitrile L10 ultrafiltration membrane from GMT Membrantechnik GmbH, Germany (a porous support).

X-22-162C is crosslinking agent (a dual end reactive silicone having carboxylic acid reactive groups, a viscosity of 220 mm 2/s and a reactive group equivalent weight of 2,300 g/mol) from Shin-Etsu Chemical Co., Ltd. (MWT 4,600).

X-22-162c

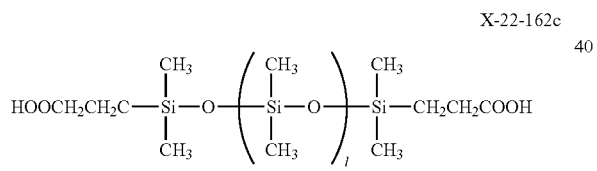

DBU is 1,8-diazabicyclo[5.4.0]undec-7-ene from Sigma Aldrich.

UV9300 is SilForce™ UV9300 from Momentive Performance Materials Holdings. This is thermally curable copolymer comprising reactive epoxy groups and linear polydimethyl siloxane chains. Furthermore, this copolymer cures rapidly when irradiated with UV light in the presence of a photo-initiator.

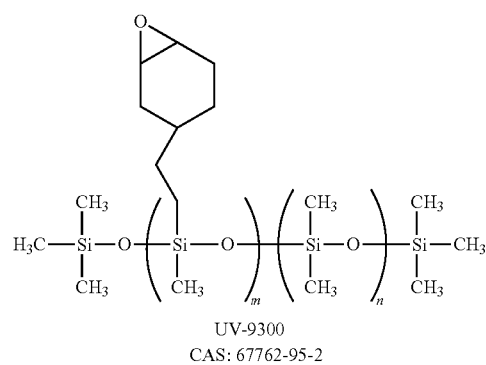

UV-9300
CAS: 67762-95-2

I0591 4-isopropyl-4'-methyldiphenyliodonium tetrakis(pentafluorophenyl) borate ($C_{40}H_{18}BF_{20}I$) from Tokyo Chemical Industries N.V. (Belgium):

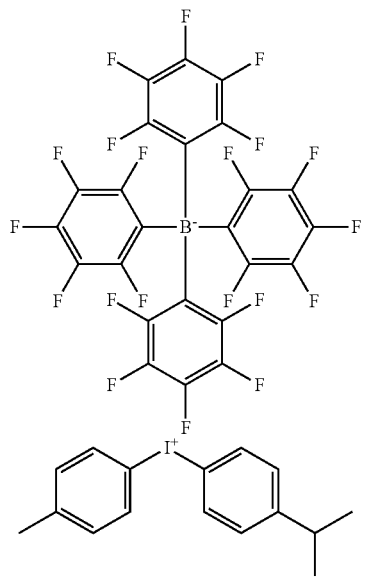

Ti(OiPr)$_4$ is titanium (IV) isopropoxide from Dorf Ketal Chemicals (MWT 284).
n-heptane is n-heptane from Brenntag Nederland BV.
MEK is 2-butanone from Brenntag Nederland BV.
MIBK is methylisobutyl ketone from Brenntag Nederland BV.
APTMS is 3-trimethoxysilyl propan-1-amine from Sigma Aldrich.
THF is tetrahydrofuran from Brenntag Nederland BV.
PI1 is 6FDA-TeMPD x/DABA y, x/y=20/80; obtained from Fujifilm Corporation, having the following structure:

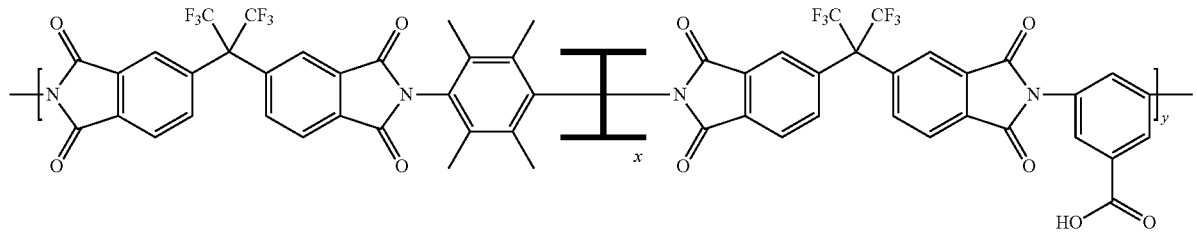

poly([(R{2,3,5,6-tetramethyl-1,4-phenylenediamine}-alt-{5,5'-[2,2,2-trifluoro-1-(trifluoromethyl)ethane-1,1-diyl]bis(isobenzofuran-1,3-dione)})-co-[{5-carboxylic-1,3-phenylenediamine}-alt-{5,5'-[2,2,2-trifluoro-1-(trifluoromethyl)ethane-1,1-diyl]bis(isobenzofuran-1,3-dione)}]) obtained from Fujifilm Corporation.

PI2 is poly([({2,3,5,6-tetramethyl-1,4-phenylenediamine}-alt-{5,5'-[2,2,2-trifluoro-1-(trifluoromethyl)ethane-1,1-diyl]bis(isobenzofuran-1,3-dione)})-co-[{1,3-phenylenediamine}-alt-{5,5'-[2,2,2-trifluoro-1-(trifluoromethyl)ethane-1,1-diyl]bis(isobenzofuran-1,3-dione)}]-co-[{5-(2-methacryloyloxy)ethoxycarbonyl-1,3-phenylenediamine}-alt-{5,5'-[2,2,2-trifluoro-1-(trifluoromethyl)ethane-1,1-diyl]bis(isobenzofuran-1,3-dione)}]) wherein the ratio of the 2,3,5,6-tetramethyl-1,4-phenylenediamine group, the 1,3-phenylenediamine group and the 5-(2-methacryloyloxy) ethoxycarbonyl-1,3-phenylenediamine group is 40:50:10, obtained from Fujifilm Corporation.

CA is cellulose acetate CA-398-3 from Eastman Chemicals.

AC is acetone from Brenntag Nederland BV.

PS783 is (84% by weight) dimethyl siloxane, (16% by weight) diphenylsiloxane; vinyl terminated, from UCT inc.

PC072 is platinum divinyl complex containing 2-3% platinum by weight from UCT inc.

PS123 is trimethylsilyl terminated methylhydro, dimethylsiloxane copolymer having 30-35% weight % of methylhydro groups, from UCT inc.

All materials were used without further purification.

(A) Measurement of Layer Thicknesses by ToF-SIMS Depth Profiling

The layer thicknesses, including the discriminating layer, $DL_e$ and $DL_i$, were measured by ToF-SIMS depth profiling using a Ulvac-PHI TRIFT V nano TOF surface analysis instrument. The following conditions were used:

Ulvac-PHI TRIFT V nano TOF, $Bi_3^{++}$ primary ion (30 kV, DC 4 nA),

Ar-GCIB $Ar_{2500}^+$, 15 kV, 1 nA for depth profile analysis.

(B) Adhesion

The strength of the adhesion between the layers of the composite membranes was measured using the method according of JIS-K5600. After aging for 16 hours at 25 degrees celsius and 60% RH, the surface of the composite membranes under test were cut using a multiple blade cutter (6 blades) at 2 mm spacing. The sticky side of an adhesive tape (77 mm in length) was applied to the cut surface and the tape was then pulled off. The cut surface was then examined visually/using a microscope to assess the extent to which the layer(s) were removed from the composite membrane. The membranes were then given a score as follows:

OK—the surface remained intact

M—the surface was only moderately damaged

NOK—the adhesive tape removed the surface layer(s)

Preparation of Radiation-Curable Polymers PCP1 and PCP2

The components UV9300, X-22-162C and DBU were dissolved in n-heptane in the amounts indicated in Table 1 and maintained at a temperature of 95° C. for 168 hours to give partially cured polymer PCP1. PCP1 had an Si content (meq/g polymer) of 12.2 and the resultant n-heptane solution of PCP1 had a viscosity of 22.8 mPas at 25.0° C. PCP2 was 100% UV9300.

TABLE 1

Ingredients used to Prepare PCP1:
PCP1

| Ingredient | Amount (w/w %) |
| --- | --- |
| UV9300 (w/w %) | 39.078 |
| X-22-162C (w/w %) | 10.789 |
| DBU (w/w %) | 0.007 |
| n-Heptane (w/w %) | 50.126 |

PCP2 was Prepared as Follows:

The catalyst PC072 was diluted to a 10% solution by weight in acetone. A mixture of PS783 (a siloxane, 4.0 g), PS123 (a crosslinking agent, 0.10 g), acetone (12.0 g) and the diluted PC072 solution (0.11 g, 10% by weight PC072) was placed in a capped test tube and kept in an oven at 61° C. for four hours, with periodic manual tumbling at approximately 20 minute intervals.

Preparation of the Curable Compositions G1 and G2

To make curable composition G1, the solution of PCP1 arising from the previous step above was cooled to 20° C. and diluted using n-heptane to give the PCP1 concentration indicated in Table 2 below. The solution was then filtered through a filter paper having a pore size of 2.7 μm. The photoinitiator I0591 and a metal complex $(Ti(OiPr)_4)$ were then added to the filtrate in the amounts indicated in Table 2 to give curable composition G1. The amount of $Ti(OiPr)_4$ present in G1 corresponded to 105.6 μmol of $Ti(OiPr)_4$ per gram of PCP1. Also the molar ratio of metal:silicon in G1 was 0.0087.

To make curable composition G2 the resultant solution of PCP2 polymer was then poured into a cup containing acetone (83.684 g) to dilute the pre-cured PS783 to a 4% solution by weight (4.0 g in 100 g total solution). A second aliquot of PS123 (0.10 g) was then added to the 100 g solution to facilitate post-curing.

Curable compositions G1 and G2 had the formulations shown in Table 2 below:

TABLE 2

Preparation of Curable Composition G1 and G2

| Ingredient | Amount (w/w %) G1 | G2 |
| --- | --- | --- |
| PCP1 polymer concentration in curable composition (w/w %) | 5.0 | — |
| PCP2 Polymer concentration in curable composition (w/w %) | — | 4.0 |
| PS123 | — | 0.1 |
| I0591 | 0.1 | — |
| $Ti(OiPr)_4$ | 0.15 | — |

The above % for G2 in Table 2 relate to the concentration of the relevant component in the acetone.

Curable compositions G1 and G2 were used to prepare the gutter layer and/or the protective layer, as described in more detail below.

Step a) Formation of the Gutter Layer

Two porous support+gutter layer composites, PSG1 and PSG2, were prepared as described below:

Preparation of the Porous Support+Gutter Layer Composite PSG1

Curable composition G1 was applied to a PAN (a porous support) by spin coating and subsequently cured using a Light Hammer LH10 from Fusion UV Systems fitted with a D-bulb with an intensity of 24 kW/m and dried. The average gutter layer thickness was determined by cutting through the PAN+gutter layer composite and measuring the thickness in several places from the surface of the PAN support outwards by SEM and calculating the average. The average gutter layer of thickness was found to be 400 nm.

Preparation of the Porous Support+Gutter Layer Composite PSG2

Curable composition G2 was applied to PAN (a porous support) by meniscus coating process at 10 m/min. The solvents were allowed to evaporate in ambient air and the composite was post-cured in an oven of about 60 degree Celsius for 2 hours to completely cure the siloxane. The average gutter layer thickness was determined by cutting through the PAN+gutter layer composite and measuring the thickness in several places from the surface of the PAN support outwards by SEM and calculating the average. The average gutter layer of thickness was found to be 1000 nm.

Step b) Formation of the Discriminating Layer

Compositions D1 to D9 used to prepare the discriminating layers were prepared by mixing the ingredients indicated in Table 3:

TABLE 3

| Ingredient | D1 | D2 | D3 | D4 | D5 | D6 | D7 | D8 | D9 |
|---|---|---|---|---|---|---|---|---|---|
| PI1 | 1.5 | 1.5 | 1.5 | 1.5 | 1.5 | 1.5 | — | — | 1.0 |
| PI2 | — | — | — | — | — | — | — | 1.5 | — |
| CA | — | — | — | — | — | — | 1.5 | — | — |
| APTMS | 0.015 | 0.015 | 0.015 | 0.015 | 0.015 | — | — | 0.015 | — |
| MIBK | 4.50 | 4.50 | 4.50 | 4.50 | 4.50 | 4.50 | 4.50 | 4.50 | — |
| THF | 7.485 | 17.485 | 27.485 | 37.485 | 47.485 | 7.500 | 7.485 | 7.485 | — |
| MEK | 86.50 | 76.50 | 66.50 | 56.50 | 46.50 | 86.50 | 86.50 | 86.50 | — |
| AC | — | — | — | — | — | — | — | — | 99.0 |

The compositions D1 to D9 were each independently applied to the porous-support+gutter layer composites indicated in Table 4 below by spin coating. A series of composite membranes were thereby prepared having a variety of discriminating layer thicknesses and % intermixing with the gutter layers.

For each composite membrane described in Table 4, ToF-SIMS depth profiling was used to measure (i) the average thicknesses of the portion of the discriminating layer which was not intermixed with the gutter layer ($DL_e$; (ii) the average thicknesses of the portion of the discriminating layer which was intermixed with the gutter layer ($DL_i$); and (iii) the average total thickness of the discriminating layer ($DL_t$). The total discriminating layer thickness $DL_t=DL_i+DL_e$. The % of the discriminating layer intermixed with the gutter layer was calculated by the equation $[DL_i/(DL_i+DL_e)\times 100\%]$ and the results are shown in Table 4.

Step c) Formation of the Protective Layer

The radiation-curable composition G1 described in Table 2 was applied by spin coating to the PAN+gutter layer+discriminating layer composite membranes indicated in Table 4 arising from step b). The composition G1 was cured thereon using a Light Hammer LH10 from Fusion UV Systems fitted with a D-bulb with an intensity of 24 kW/m and dried.

The protective layer thickness was measured by cutting through the composite membrane and measuring the thickness of the outermost layer from the surface of the discriminating layer by SEM. In the examples which contained a protective layer, the thickness of the protective layer was found to be 600 nm.

Results

The adhesion properties of the resultant composite membranes are described in Table 4 below:

TABLE 4

| Composite Membrane Components | | | | | | |
|---|---|---|---|---|---|---|
| PS + GL | DL | PL | $DL_e$ | $DL_i$ | % intermix | Adhesion |
| Ex. 1 | PSG1 | D1 | G1 | 75 | 15 | 17 | OK |
| Ex. 2 | PSG1 | D1 | G1 | 352 | 48 | 12 | OK |
| Ex. 3 | PSG1 | D1 | G1 | 27 | 13 | 33 | OK |
| Ex. 4 | PSG1 | D2 | G1 | 70 | 20 | 22 | OK |
| Ex. 5 | PSG1 | D3 | G1 | 66 | 24 | 27 | OK |
| Ex. 6 | PSG1 | D4 | G1 | 48 | 42 | 47 | OK |
| Ex. 7 | PSG1 | D5 | G1 | 32 | 58 | 64 | OK |
| Ex. 8 | PSG1 | D6 | G1 | 79 | 11 | 12 | M |
| Ex. 9 | PSG1 | D7 | G1 | 70 | 20 | 22 | OK |
| Ex. 10 | PSG2 | D1 | G1 | 79 | 11 | 12 | OK |
| Ex. 11 | PSG1 | D8 | G1 | 77 | 13 | 14 | M |
| Ex12 | PSG1 | D1 | — | 75 | 15 | 17 | OK |

TABLE 4-continued

| Composite Membrane Components | | | | | | |
|---|---|---|---|---|---|---|
| PS + GL | DL | PL | $DL_e$ | $DL_i$ | % intermix | Adhesion |
| Ex13 | PSG1 | D7 | — | 70 | 20 | 22 | OK |
| Cex1 | PSG1 | D9 | G1 | 90 | 0 | 0 | NOK |

Note:
In Table 4, "PSG" refers to the porous support + gutter layer composite used to make the composite membrane. D1 to D9 refer to the compositions used to make the discriminating layer. G1 refers to the curable composition used to make the protective layer, when present. $DL_e$ and $DL_i$ were measured by ToF-SIMS depth profiling.

The invention claimed is:

1. A composite membrane comprising:
   a) a porous support;
   b) a gutter layer; and
   c) a discriminating layer;
   wherein the discriminating layer comprises a polyimide, cellulose acetate, polyethyleneoxide or polyetherimide and wherein at least 10% of the discriminating layer is intermixed with the gutter layer.

2. The composite membrane according to claim 1 wherein the discriminating layer has an average thickness of 10 to 400 nm.

3. The composite membrane according to claim 1, wherein the discriminating layer comprises a polyimide comprising trifluoromethyl groups.

4. The composite membrane according to claim 1, wherein the discriminating layer comprises a polyimide comprising groups of the Formula (1):

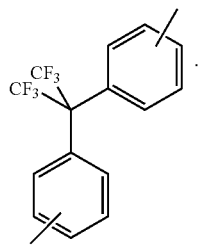

Formula (1)

5. The composite membrane according to claim 1, wherein a portion of the gutter layer is present within the support and a portion of the gutter layer is outside of the support and the following conditions are satisfied:
  (i) the portion of the gutter layer outside of the support has an average thickness ($GL_e$) of 10 nm to 900 nm; and
  (ii) the portion of the gutter layer present within the support has an average thickness ($GL_i$) of 10% to 350% of $GL_e$.

6. A gas separation module comprising a composite membrane according claim 1.

7. The composite membrane according to claim 1 wherein a portion of the gutter layer is present within the support and a portion of the gutter layer is outside of the support and the following conditions are satisfied:
  (i) the portion of the gutter layer outside of the support has an average thickness ($GL_e$) of 200 nm to 900 nm; and
  (ii) the portion of the gutter layer present within the support has an average thickness ($GL_i$) of 10% to 200% of $GL_e$.

8. The composite membrane according to claim 1 wherein a portion of the gutter layer is present within the support and a portion of the gutter layer is outside of the support and the following conditions are satisfied:
  (i) the portion of the gutter layer outside of the support has an average thickness ($GL_e$) of 400 nm to 900 nm; and
  (ii) the portion of the gutter layer present within the support has an average thickness ($GL_i$) of 20% to 90% of $GL_e$.

9. The composite membrane according to claim 7 wherein the discriminating layer comprises a polyimide comprising trifluoromethyl groups.

10. The composite membrane according to claim 8 wherein the gutter layer comprises dialkylsiloxane groups.

11. The composite membrane according to claim 1 wherein the gutter layer contains a metal and silicon in a molar ratio of at least 0.0005.

12. The composite membrane according to claim 1 which has a pure water permeability at 20° C. of less than $6 \times 10^{-8}$ $m^3/m^2 \cdot s \cdot kPa$.

13. The composite membrane according to claim 1 which has a dry thickness of 20 to 500 μm.

14. The composite membrane according to claim 10 which has a pure water permeability at 20° C. of less than $6 \times 10^{-8}$ $m^3/m^2 \cdot s \cdot kPa$ and a dry thickness of 20 to 500 μm.

15. A gas separation module comprising a composite membrane according to claim 8.

16. A gas separation module comprising a composite membrane according to claim 14.

* * * * *